(12) United States Patent
De (10) Patent No.: US 11,188,474 B2
(45) Date of Patent: Nov. 30, 2021

(54) BALANCED CACHING BETWEEN A CACHE AND A NON-VOLATILE MEMORY BASED ON RATES CORRESPONDING TO THE CACHE AND THE NON-VOLATILE MEMORY

(71) Applicant: Western Digital Technologies, Inc., San Jose, CA (US)

(72) Inventor: Arup De, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 73 days.

(21) Appl. No.: 16/012,607

(22) Filed: Jun. 19, 2018

(65) Prior Publication Data

US 2019/0384713 A1    Dec. 19, 2019

(51) Int. Cl.
  *G06F 3/06*      (2006.01)
  *G06F 12/0888*   (2016.01)
  *G06F 12/0868*   (2016.01)

(52) U.S. Cl.
  CPC ...... *G06F 12/0888* (2013.01); *G06F 12/0868* (2013.01); *G06F 2212/1021* (2013.01)

(58) Field of Classification Search
  CPC ............. G06F 12/0888; G06F 12/0868; G06F 2212/1021; G06F 2212/7202; G06F 2212/7203; G06F 12/0246
  USPC ......................... 711/138, 116, 129, 133, 137
  See application file for complete search history.

(56) References Cited

U.S. PATENT DOCUMENTS

| | | | |
|---|---|---|---|
| 9,904,474 B2 | 2/2018 | Kumabe et al. | |
| 9,933,952 B1 | 4/2018 | Li et al. | |
| 10,482,033 B2* | 11/2019 | Lee | G06F 12/126 |
| 2004/0054860 A1* | 3/2004 | Dixit | G06F 12/0888 |
| | | | 711/160 |
| 2007/0276993 A1* | 11/2007 | Hiratsuka | G06F 12/0862 |
| | | | 711/112 |
| 2011/0035540 A1* | 2/2011 | Fitzgerald | G06F 3/061 |
| | | | 711/103 |

(Continued)

FOREIGN PATENT DOCUMENTS

| | | |
|---|---|---|
| KR | 100891116 B1 | 3/2009 |
| KR | 101563875 B1 | 10/2015 |

OTHER PUBLICATIONS

Djorde Jevdjic et al., Die-Stacked DRAM Caches for Servers Hit Ratio, Latency, or Bandwidth? Have It All with Footprint Cache, In Proceedings of the 40th International Symposium on Computer Architecture (ISCA 2013).

(Continued)

*Primary Examiner* — Hong C Kim
(74) *Attorney, Agent, or Firm* — Kunzler Bean & Adamson, PC (57) ABSTRACT

Apparatuses, systems, methods, and computer program products are disclosed for balanced caching. An input circuit receives a request for data of non-volatile storage. A balancing circuit determines whether to execute a request by directly communicating with one or more of a cache and a non-volatile storage based on a first rate corresponding to the cache and a second rate corresponding to the non-volatile storage. A data access circuit executes a request based on a determination made by a balancing circuit.

20 Claims, 7 Drawing Sheets

(56) References Cited

U.S. PATENT DOCUMENTS

| | | | |
|---|---|---|---|
| 2012/0226866 A1* | 9/2012 | Bozek | G06F 9/45558 |
| | | | 711/122 |
| 2015/0113356 A1* | 4/2015 | Ken | H01L 25/0657 |
| | | | 714/764 |
| 2015/0234747 A1* | 8/2015 | Tanaka | G06F 12/0875 |
| | | | 711/125 |
| 2015/0309927 A1* | 10/2015 | Sinclair | G06F 3/0658 |
| | | | 711/103 |
| 2017/0220467 A1* | 8/2017 | Elias | G06F 12/0806 |
| 2017/0277636 A1* | 9/2017 | Lee | G06F 12/126 |
| 2018/0067860 A1* | 3/2018 | Traut | G06F 12/0868 |
| 2018/0348838 A1* | 12/2018 | Cox | G06F 3/0634 |
| 2019/0057037 A1* | 2/2019 | Anderson | G06F 12/0895 |
| 2019/0121541 A1* | 4/2019 | Zhao | G06F 3/061 |

OTHER PUBLICATIONS

Gabriel H. Loh, et al., Efficiently Enabling Conventional Block Sizes for Very Large Die-stacked DRAM Caches, Proceedings of the 44th Annual IEEE/ACM International Symposium on Microarchitecture, pp. 454-464, Porto Alegre, Brazil—Dec. 3-7, 2011.

International Patent Application No. PCT/US19/19915, "Notification of transmittal of the international search report and the written opinion of the international searching authority, or the declaration", dated Jun. 18, 2019, pp. 1-12.

* cited by examiner

BALANCED CACHING BETWEEN A CACHE AND A NON-VOLATILE MEMORY BASED ON RATES CORRESPONDING TO THE CACHE AND THE NON-VOLATILE MEMORY

TECHNICAL FIELD

The present disclosure, in various embodiments, relates to balanced caching and more particularly relates to balanced caching for one or more integrated circuit devices.

BACKGROUND

Various factors may result in high latency and/or low endurance in integrated circuits. For example, a cache of an integrated circuit may limit bandwidth for accessing data of the integrated circuit. Latency for accessing the data of the integrated circuit may be increased in response to cache misses.

SUMMARY

Apparatuses are presented for balanced caching. In one embodiment, an apparatus includes an input circuit that receives a request for data of non-volatile storage. In certain embodiments, an apparatus includes a balancing circuit that determines whether to execute a request by directly communicating with one or more of a cache and a non-volatile storage based on a first rate corresponding to the cache and a second rate corresponding to the non-volatile storage. In various embodiments, an apparatus includes a data access circuit that executes a request based on a determination made by a balancing circuit.

Methods are presented for balanced caching. In one embodiment, a method includes receiving a request for data of non-volatile memory. In some embodiments, a method includes determining whether to access data by directly communicating with one or more of a cache and a non-volatile memory based on a first bus width corresponding to the cache and a second bus width corresponding to the non-volatile storage. In certain embodiments, a method includes, in response to determining to access data by directly communicating with a cache, accessing the data by directly communicating with the cache. In various embodiments, a method includes, in response to determining to access data by directly communicating with a non-volatile memory, accessing the data by bypassing a cache and directly communicating with the non-volatile memory.

Systems are presented for balanced caching. In one embodiment, a system includes a cache, a non-volatile memory, and a controller. In some embodiments, a controller is configured to determine a first bandwidth corresponding to a cache. In certain embodiments, a controller is configured to determine a second bandwidth corresponding to a non-volatile memory. In various embodiments, a controller is configured to determine whether to directly communicate with one or more of a cache and a non-volatile memory based on a first bandwidth and a second bandwidth. In certain embodiments, a controller is configured to, in response to determining to directly communicate with a cache, directly communicate with the cache. In some embodiments, a controller is configured to, in response to determining to directly communicate with a non-volatile memory, bypass a cache and directly communicate with the non-volatile memory.

Additional apparatuses are presented for balanced caching. In one embodiment, an apparatus includes means for receiving a request to access data of a memory device. In some embodiments, an apparatus includes means for determining a number of direct communications with a cache to access data. In certain embodiments, an apparatus includes means for determining a number of direct communications with a memory device. In various embodiments, an apparatus includes means for determining whether to access data by directly communicating with one or more of a cache and a memory device based on a number of direct communications with the cache and the number of direct communications with the memory device.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification may have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not be limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Figure 1:
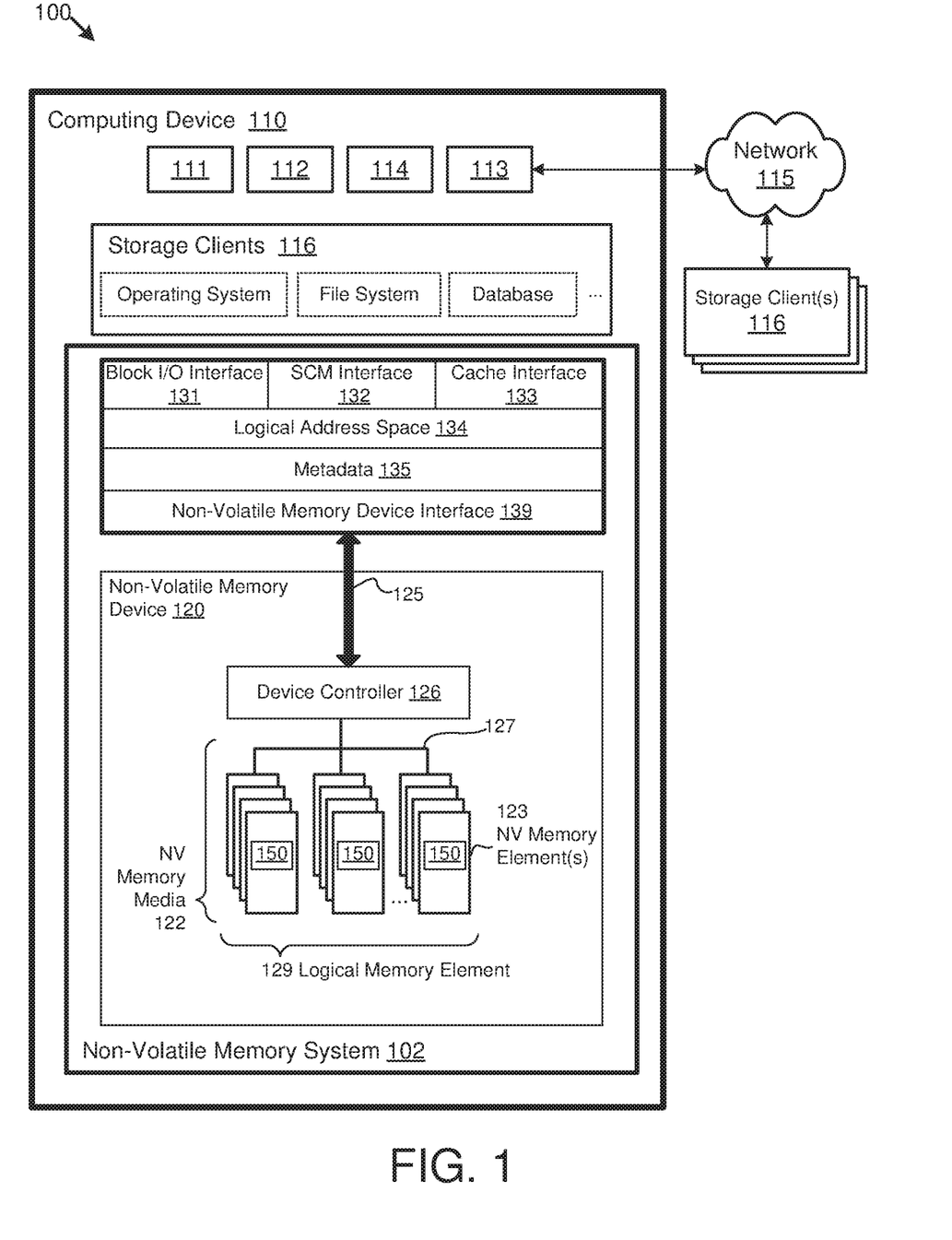
FIG. 1 is a schematic block diagram of one embodiment of a system comprising a balancing component.

FIG. 1 is a block diagram of one embodiment of a system 100 comprising one or more balancing components 150 for a memory device 120 and/or another integrated circuit device 120. A balancing component 150 may be part of a memory element 123, and may be in communication with a device controller 126, a device driver, or the like. In some embodiments, a balancing component 150 may at least partially operate on and/or be in communication with a memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or device 126 to a communication network 115, such as an Internet Protocol (IP) network, a Storage Area Network (SAN), wireless network, wired network, or the like.

The memory device 120, in various embodiments, may be disposed in one or more different locations relative to the computing device 110. In one embodiment, the memory device 120 comprises one or more volatile and/or non-volatile memory elements 123, such as semiconductor chips, die, packages, or other integrated circuit devices disposed on one or more printed circuit boards, storage housings, and/or other mechanical and/or electrical support structures. For example, the memory device 120 may comprise one or more direct inline memory module (DIMM) cards, one or more expansion cards and/or daughter cards, a memory card, a universal serial bus (USB) drive, a solid-state-drive (SSD) or other hard drive device, and/or may have another memory and/or storage form factor. The memory device 120 may be integrated with and/or mounted on a motherboard of the computing device 110, installed in a port and/or slot of the computing device 110, installed on a different computing device 110 and/or a dedicated storage appliance on the network 115, in communication with the computing device 110 over an external bus (e.g., an external hard drive), or the like.

The memory device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the memory device 120 may be disposed on a peripheral bus of the computing device 110, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the memory device 120 may be disposed on a data network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The computing device 110 may further comprise a non-transitory, computer readable storage medium 114. The computer readable storage medium 114 may comprise executable instructions configured to cause the computing device 110 (e.g., processor 111) to perform steps of one or more of the methods disclosed herein. Alternatively, or in addition, the balancing component 150 may include one or more computer readable instructions stored on the non-transitory storage medium 114.

The memory system 102, in the depicted embodiment, includes one or more balancing components 150. A balancing component 150, in one embodiment, is configured to receive a request for data of non-volatile storage (e.g., memory device 120), determine whether to execute the request by directly communicating with one or more of a cache (e.g., via the cache interface 133) and the non-volatile storage (e.g., based on a first rate corresponding to the cache and a second rate corresponding to the non-volatile storage, based on a first bus width corresponding to the cache and a second bus width corresponding to the non-volatile storage), and execute the request based on the determination made. In this manner, a balancing component 150, in certain embodiments, may balance communication between the cache and the non-volatile storage.

In one embodiment, a balancing component 150 may comprise logic hardware of a memory element 123, other programmable logic, firmware for a memory element 123, microcode for execution by a memory element 123, or the like. In another embodiment, a balancing component 150 may comprise executable software code, stored on a computer readable storage medium for execution by logic hardware of a memory element 123. In a further embodiment, a balancing component 150 may include a combination of both executable software code and logic hardware.

In one embodiment, the balancing component 150 is configured to receive storage requests from a device driver or other executable application via buses 125, 127, a device controller 126, or the like. The balancing component 150 may be further configured to transfer data to/from a device driver and/or storage clients 116 via the bus 125. Accordingly, the balancing component 150, in some embodiments, may comprise and/or be in communication with one or more direct memory access (DMA) modules, remote DMA modules, bus controllers, bridges, buffers, and so on to facilitate the transfer of storage requests and associated data. In another embodiment, the balancing component 150 may receive storage requests as an API call from a storage client 116, as an IO-CTL command, or the like. The balancing component 150 is described in further detail below with regard to FIG. 3.

According to various embodiments, a device controller 126 may manage one or more memory devices 120 and/or memory elements 123. The memory device(s) 120 may comprise recording, memory, and/or storage devices, such as solid-state storage device(s) and/or semiconductor storage device(s) that are arranged and/or partitioned into a plurality of addressable media storage locations. As used herein, a media storage location refers to any physical unit of memory (e.g., any quantity of physical storage media on a memory device 120). Memory units may include, but are not limited to: pages, memory divisions, blocks, sectors, collections or sets of physical storage locations (e.g., logical pages, logical blocks), or the like.

A device driver and/or the device controller 126, in certain embodiments, may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the memory device 120 may maintain metadata 135, such as a logical to physical address mapping structure, to map logical addresses of the logical address space 134 to media storage locations on the memory device(s) 120. A device driver may be configured to provide storage services to one or more storage clients 116. The storage clients 116 may include local storage clients 116 operating on the computing device 110 and/or remote, storage clients 116 accessible via the network 115 and/or network interface 113. The storage clients 116 may include, but are not limited to: operating systems, file systems, database applications, server applications, kernel-level processes, user-level processes, applications, and the like.

A device driver may be communicatively coupled to one or more memory devices 120. The one or more memory devices 120 may include different types of memory devices including, but not limited to: volatile memory devices, solid-state storage devices, semiconductor storage devices, SAN storage resources, or the like. The one or more memory devices 120 may comprise one or more respective device controllers 126 and memory media 122. A device driver may provide access to the one or more memory devices 120 via a traditional block I/O interface 131. Additionally, a device driver may provide access to enhanced functionality through the SCM interface 132. The metadata 135 may be used to manage and/or track data operations performed through any of the Block I/O interface 131, SCM interface 132, cache interface 133, or other, related interfaces.

The cache interface 133 may expose cache-specific features accessible via a device driver for the memory device 120. Also, in some embodiments, the SCM interface 132 presented to the storage clients 116 provides access to data transformations implemented by the one or more memory devices 120 and/or the one or more device controllers 126.

A device driver may present a logical address space 134 to the storage clients 116 through one or more interfaces. As discussed above, the logical address space 134 may comprise a plurality of logical addresses, each corresponding to respective media locations the on one or more memory devices 120. A device driver may maintain metadata 135 comprising any-to-any mappings between logical addresses and media locations, or the like.

A device driver may further comprise and/or be in communication with a memory device interface 139 configured to transfer data, commands, and/or queries to the one or more memory devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The memory device interface 139 may communicate with the one or more memory devices 120 using input-output control (IO-CTL) command(s), IO-CTL command extension(s), remote direct memory access, or the like.

The communication interface 113 may comprise one or more network interfaces configured to communicatively couple the computing device 110 and/or the device controller 126 to a network 115 and/or to one or more remote, network-accessible storage clients 116. The storage clients 116 may include local storage clients 116 operating on the computing device 110 and/or remote, storage clients 116 accessible via the network 115 and/or the network interface 113. The device controller 126 is part of and/or in communication with one or more memory devices 120. Although FIG. 1 depicts a single memory device 120, the disclosure is not limited in this regard and could be adapted to incorporate any number of memory devices 120.

The memory device 120 may comprise one or more elements 123 of volatile and/or non-volatile memory media 122, which may include but is not limited to: volatile memory such as SRAM and/or dynamic random-access memory (DRAM); non-volatile memory such as ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), and/or optical storage media; or other memory and/or storage media. The one or more elements 123 of memory media 122, in certain embodiments, comprise storage class memory (SCM).

While legacy technologies such as NAND flash may be block and/or page addressable, storage class memory, in one embodiment, is byte addressable. In further embodiments, storage class memory may be faster and/or have a longer life (e.g., endurance) than NAND flash; may have a lower cost, use less power, and/or have a higher storage density than DRAM; or offer one or more other benefits or improvements when compared to other technologies. For example, storage class memory may comprise one or more non-volatile memory elements 123 of ReRAM, Memristor memory, programmable metallization cell memory, phase-change memory, nano RAM, nanocrystal wire-based memory, silicon-oxide based sub-10 nanometer process memory, graphene memory, SONOS memory, PMC memory, CBRAM, MRAM, and/or variations thereof.

While the memory media 122 is referred to herein as "memory media," in various embodiments, the memory media 122 may more generally comprise one or more volatile and/or non-volatile recording media capable of recording data, which may be referred to as a memory medium, a storage medium, or the like. Further, the memory device 120, in various embodiments, may comprise a recording device, a memory device, a storage device, or the like. Similarly, a memory element 123, in various embodiments, may comprise a recording element, a memory element, a storage element, or the like. In other embodiments, a memory element 123 may comprise a different type of integrated circuit device (e.g., an ASIC, a CPU, a communications device, a graphics device, a system on a chip, a programmable logic device, or the like), and memory elements 123 are used only by way of example as one type of integrated circuit device (e.g., integrated circuit die, chip, die plane, package, or the like) for which the balancing component 150 may balance access to.

The memory media 122 may comprise one or more memory elements 123, which may include, but are not limited to: chips, packages, planes, die, or the like. A device controller 126 may be configured to manage data operations on the memory media 122, and may comprise one or more processors, programmable processors (e.g., FPGAs), ASICs, micro-controllers, or the like. In some embodiments, the device controller 126 is configured to store data on and/or read data from the memory media 122, to transfer data to/from the memory device 120, and so on.

The device controller 126 may be communicatively coupled to the memory media 122 by way of a bus 127. The bus 127 may comprise an I/O bus for communicating data to/from the memory elements 123. The bus 127 may further comprise a control bus for communicating addressing and other command and control information to the memory elements 123. In some embodiments, the bus 127 may communicatively couple the memory elements 123 to the device controller 126 in parallel. This parallel access may allow the memory elements 123 to be managed as a group, forming a logical memory element 129. The logical memory element may be partitioned into respective logical memory units (e.g., logical pages) and/or logical memory divisions (e.g., logical blocks). The logical memory units may be formed by logically combining physical memory units of each of the memory elements 123.

The device controller 126 may comprise and/or be in communication with a device driver executing on the computing device 110. A device driver may provide storage services to the storage clients 116 via one or more interfaces 131, 132, and/or 133. In some embodiments, a device driver provides a block-device I/O interface 131 through which storage clients 116 perform block-level I/O operations. Alternatively, or in addition, a device driver may provide a storage class memory (SCM) interface 132, which may provide other storage services to the storage clients 116. In some embodiments, the SCM interface 132 may comprise extensions to the block device interface 131 (e.g., storage clients 116 may access the SCM interface 132 through extensions or additions to the block device interface 131). Alternatively, or in addition, the SCM interface 132 may be provided as a separate API, service, and/or library. A device driver may be further configured to provide a cache interface 133 for caching data using the memory system 102. A device driver may further comprise a memory device interface 139 that is configured to transfer data, commands, and/or queries to the device controller 126 over a bus 125, as described above.

Figure 2:
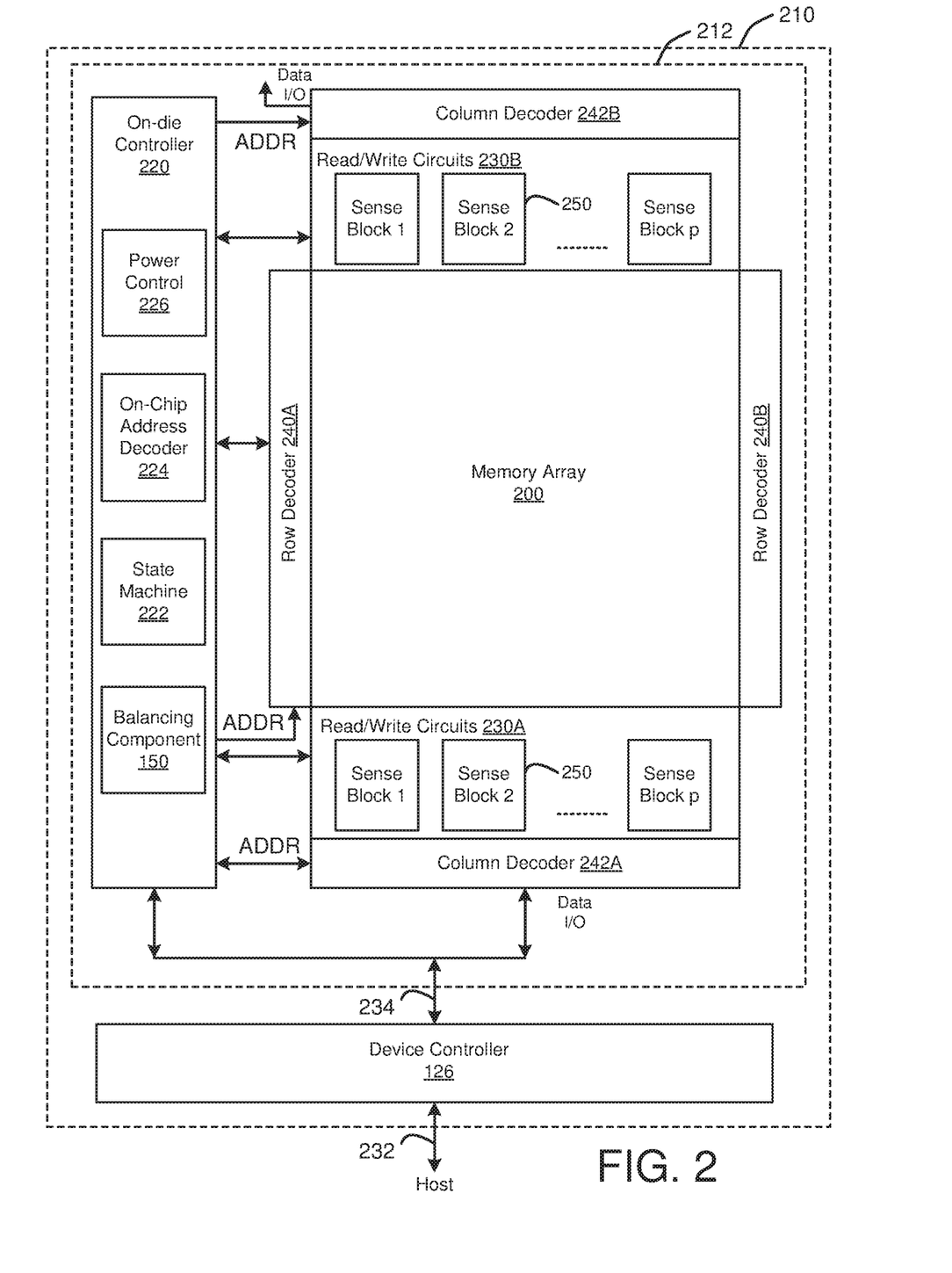
FIG. 2 is a schematic block diagram illustrating another embodiment of a system comprising a balancing component.

FIG. 2 depicts one embodiment of a storage device 210 that may include one or more memory die or chips 212, and/or another type of integrated circuit device 212. The storage device 210 may be substantially similar to the memory device 120 described with reference to FIG. 1. Memory die 212, in some embodiments, includes an array (two-dimensional or three dimensional) of memory cells 200, die controller 220, and read/write circuits 230A/230B. In one embodiment, access to the memory array 200 by the various peripheral circuits is implemented in a symmetric fashion, on opposite sides of the array, so that the densities of access lines and circuitry on each side are reduced by half. The read/write circuits 230A/230B, in a further embodiment, include multiple sense blocks 250 which allow a page of memory cells to be read or programmed in parallel.

The memory array 200, in various embodiments, is addressable by word lines via row decoders 240A/240B and by bit lines via column decoders 242A/242B. In some embodiments, a device controller 126 is included in the same memory device 210 (e.g., a removable storage card or package) as the one or more memory die 212. Commands and data are transferred between the host and the device controller 126 via lines 232 and between the device controller 126 and the one or more memory die 212 via lines 234. One implementation can include multiple chips 212, a chip 212 may include multiple die 212 and/or die planes 212, or the like.

The die controller 220, in one embodiment, cooperates with the read/write circuits 230A/230B to perform memory operations on the memory array 200. The die controller 220, in certain embodiments, includes a balancing component 150, a state machine 222, an on-die address decoder 224, and a power control circuit 226. The balancing component 150, in one embodiment, is configured to receive a request for data of non-volatile memory. The balancing component 150 may determine whether to access the data by directly communicating with one or more of a cache and the non-volatile memory based on a first rate (or bus width) corresponding to the cache and a second rate (or bus width) corresponding to the non-volatile storage. The balancing component 150 may, in response to determining to access the data by directly communicating with the cache, access the data by directly communicating with the cache. The balancing component 150 may, in response to determining to access the data by directly communicating with the non-volatile memory, access the data by bypassing the cache and directly communicating with the non-volatile memory.

The state machine 222, in one embodiment, provides chip-level control of memory operations. The on-die address decoder 224 provides an address interface to convert between the address that is used by the host or a memory controller to the hardware address used by the decoders 240A, 240B, 242A, 242B. The power control circuit 226 controls the power and voltages supplied to the word lines and bit lines during memory operations. In one embodiment, power control circuit 226 includes one or more charge pumps that can create voltages larger than the supply voltage.

In certain embodiments, the state machine 222 includes an embodiment of the balancing component 150. The balancing component 150, in certain embodiments, may include software, firmware, and/or hardware in a die controller 220 and/or a state machine 222.

In one embodiment, one or any combination of die controller 220, balancing component 150, power control circuit 226, decoder circuit 224, state machine circuit 222, decoder circuit 242A, decoder circuit 242B, decoder circuit 240A, decoder circuit 240B, read/write circuits 230A, read/write circuits 230B, and/or controller 126 can be referred to as one or more managing circuits.

Figure 3:
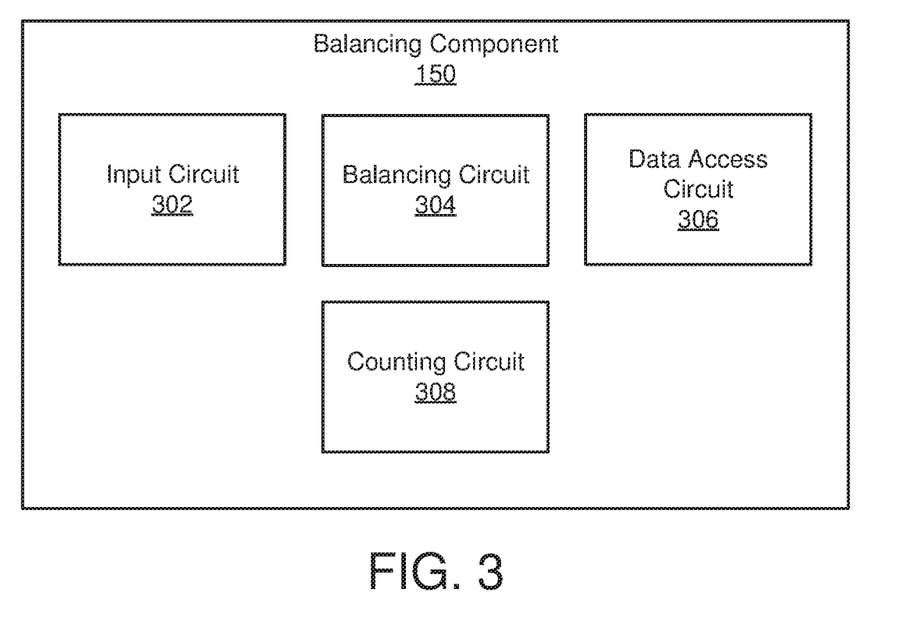
FIG. 3 is a schematic block diagram illustrating one embodiment of a balancing component.

FIG. 3 depicts one embodiment of a balancing component 150. The balancing component 150 may be substantially similar to the balancing component 150 described above with regard to FIG. 1 and FIG. 2. In general, as described above, the balancing component 150 is configured to receive a request for data of non-volatile storage, determine whether to execute the request by directly communicating with one or more of a cache and the non-volatile storage, and execute the request based on the determination. In the depicted embodiment, the balancing component 150 includes an input circuit 302, a balancing circuit 304, a data access circuit 306, and a counting circuit 308, which may be part of an on-die controller or other on-die circuitry.

In one embodiment, the input circuit 302 receives a request for data of non-volatile storage, non-volatile memory, and/or a memory device (e.g., non-volatile memory device 120). The request for data may be a request to access data, a request to read data, and/or a request to write data. The request may be received from a host device (e.g., computing device 110) via an interface (e.g., non-volatile memory device interface) with the input circuit 302. In some embodiments, the input circuit 302 may also function as an output circuit for providing data corresponding to the request to the host device.

In various embodiments, the balancing circuit 304 determines whether to execute a request received by the input circuit 302 by directly communicating with a cache and/or a non-volatile storage. In some embodiments, the balancing circuit 304 determines whether to execute a request received by the input circuit 302 by directly communicating with a cache and/or a non-volatile storage based on a first rate corresponding to the cache and a second rate corresponding to the non-volatile storage. In certain embodiments, the balancing circuit 304 determines whether to execute a request received by the input circuit 302 by directly communicating with a cache and/or a non-volatile storage based on a first bus width corresponding to the cache and a second bus width corresponding to the non-volatile storage. In one embodiment, the balancing circuit 304 may determine to directly communicate with the cache, while, in another embodiment, the balancing circuit 304 may determine to directly communicate with the non-volatile storage (e.g., bypass communication with the cache). In certain embodiments, the balancing circuit 304 may determine to directly communicate with the cache and the non-volatile storage. In some embodiments, the balancing circuit 304 may determine whether to execute a request received by the input circuit 302 by determining a cache hit count and a total access count. As used herein, a cache hit count may refer to a number of times that a cache hit occurs. Moreover, a cache hit described herein may refer to a state in which data requested from a cache is found in the cache. Furthermore, as used herein, a total access count may refer to a total number of attempts to access a cache and a non-volatile storage.

In certain embodiments, the balancing circuit 304 may determine to directly communicate with a cache in response to a relationship between a cache hit count and a total access count being less than a predetermined threshold. For example, a cache hit rate may be determined by dividing the cache hit count by the total access count. In one embodiment, the balancing circuit 304 may determine to directly communicate with a cache in response to the cache hit rate being less than a predetermined threshold (e.g., a predetermined cache hit rate). For example, the balancing circuit 304 may determine to directly communicate with the cache in response to the cache hit rate being less than approximately 10%, 20%, 45%, 50%, 60%, and so forth. In some embodiments, the predetermined threshold is determined based on a comparison between a bandwidth of a cache and a bandwidth of a non-volatile storage. For example, if the bandwidth of the cache is the same as the bandwidth of the non-volatile storage, the predetermined threshold may be approximately 50%.

In various embodiments, the balancing circuit 304 may determine to directly communicate with the non-volatile memory in response to a relationship between the cache hit count and the total access count being greater than a predetermined threshold. For example, a cache hit rate may be determined by dividing the cache hit count by the total access count. In one embodiment, the balancing circuit 304 may determine to directly communicate with a non-volatile memory in response to the cache hit rate being greater than a predetermined threshold (e.g., a predetermined cache hit rate). For example, the balancing circuit 304 may determine to directly communicate with the non-volatile memory in response to the cache hit rate being greater than approximately 10%, 20%, 45%, 50%, 60%, and so forth.

In certain embodiments, the balancing circuit 304 may determine to migrate pages from a non-volatile memory to a cache in response to a relationship between the cache hit count and the total access count being less than a predetermined threshold. In some embodiments, the balancing circuit 304 may determine to migrate pages from a cache to a non-volatile memory in response to a relationship between the cache hit count and the total access count being greater than a predetermined threshold.

In various embodiments, the balancing circuit 304 may determine to directly communicate with a cache and/or a non-volatile memory by determining a first bandwidth corresponding to the cache and a second bandwidth corresponding to the non-volatile memory, and accessing the data based on the first bandwidth and the second bandwidth. For example, the balancing circuit 304 may determine to access the data based on a ratio between the first bandwidth and the second bandwidth. In one embodiment, in response to the first bandwidth and the second bandwidth being approximately the same, the balancing circuit 304 may directly access the cache approximately 50% of the time and may directly access the non-volatile memory approximately 50% of the time. In another embodiment, in response to a ration between the first bandwidth and the second bandwidth being 3:1, the balancing circuit 304 may directly access the cache approximately 75% of the time and may directly access the non-volatile memory approximately 25% of the time.

In certain embodiments, the balancing circuit 304 may determine to directly communicate with the cache and/or the non-volatile memory based on a number of direct communications with the cache and a number of direct communications with the non-volatile memory.

In certain embodiments, the data access circuit 306 executes a request for data based on the determination made by the balancing circuit 304. In one embodiment, the data access circuit 306 executes the request by directly communicating with a cache in response to the balancing circuit 304 determining to execute the request by directly communicating with the cache. In some embodiments, the data access circuit 306 executes the request by bypassing communication with a cache in response to the balancing circuit 304 determining to execute the request by directly communicating with a non-volatile memory. In various embodiments, the data access circuit 306 executes the request by accessing a first portion of the data by directly communicating with a cache and accessing a second portion of the data by directly communicating with a non-volatile memory.

In some embodiments, the counting circuit 308 determines a cache hit count used to determine a cache hit ratio. In such embodiments, the cache hit ratio may be determined by dividing the cache hit count by a total count. If the cache hit ratio is greater than an objective rate, data may be migrated from the cache to the non-volatile memory. In contrast, if the cache hit ratio is less than or equal to the objective rate, data may be migrated from the non-volatile memory to the cache. In certain embodiments, the balancing circuit 304 uses the cache hit ratio to determine whether to execute a request for data by directly communicating with a cache and/or a non-volatile memory. In various embodiments, the balancing circuit 304 determines to move pages from a non-volatile memory to a cache in response to a cache hit ratio being less than a predetermined value. In some embodiments, the balancing circuit 304 determines to move pages from the cache to the non-volatile memory in response to the cache hit ratio being greater than a predetermined value. In certain embodiments, the counting circuit 308 determines a number of direct communications with a cache to access data. In various embodiments, the counting circuit 308 determines a number of direct communications with a non-volatile memory.

As described above with regard to FIGS. 1 and 2, a memory device 120 may include one or more memory elements 123 or dies 123. In other embodiments, a die 123 may comprise a different type of integrated circuit, instead of or in addition to comprising memory (e.g., an ASIC, a CPU, a communications device, a graphics device, a system on a chip, a programmable logic device, or the like). In various embodiments, an on-die controller 220 may refer to a component on a die, control/operation logic on a die, a set of components on a die, or the like, that controls data operations for a memory array 200 on the die.

Figure 4:
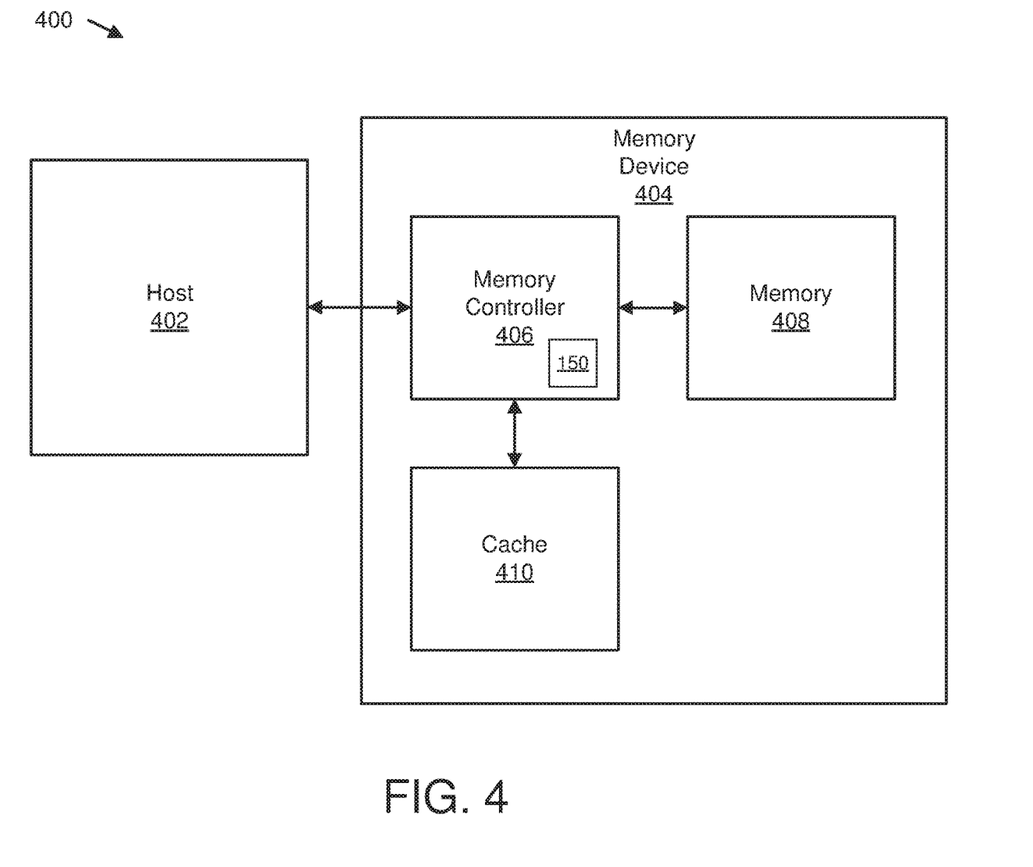
FIG. 4 is a schematic block diagram illustrating another embodiment of a system comprising a balancing component.

FIG. 4 is a schematic block diagram illustrating another embodiment of a system 400 comprising a balancing component 150. The system 400 includes a host 402 and a memory device 404. The host 402 may be similar to the computing device 110 of FIG. 1. Moreover, the memory device 404 may be similar to the non-volatile memory system 102 of FIG. 1. In one embodiment, the memory device 404 may be a non-volatile DIMM (NVDIMM). As illustrated, the memory device 404 includes a memory controller 406, a memory 408, and a cache 410. The memory controller 406 may be similar to the device controller 126 of FIG. 1, the on-die controller 220 of FIG. 2, or any other controller described herein. As illustrated, the memory controller 406 may include the balancing component 150.

The memory controller 406 may receive instructions and/or data from the host 402 and may transmit data to the host 402. Moreover, the memory controller 406 may communicate directly with the memory 408 and the cache 410. In one embodiment, the memory controller 406 may be a NVDIMM controller. The memory 408 may be any suitable memory device and/or storage device (e.g., non-volatile memory). For example, the memory 408 may be similar to the non-volatile memory media 122 of FIG. 1, the non-volatile memory elements 123 of FIG. 1, and/or the memory array 200 of FIG. 2. In one embodiment, the memory 408 may be a non-volatile memory array. The cache 410 may be any suitable cache. As used herein, cache may refer to a type of memory that stores recently used information so that it can be quickly accessed at a later time. In some embodiments, the cache 410 may be DRAM and/or high bandwidth memory (HBM).

Figure 5:
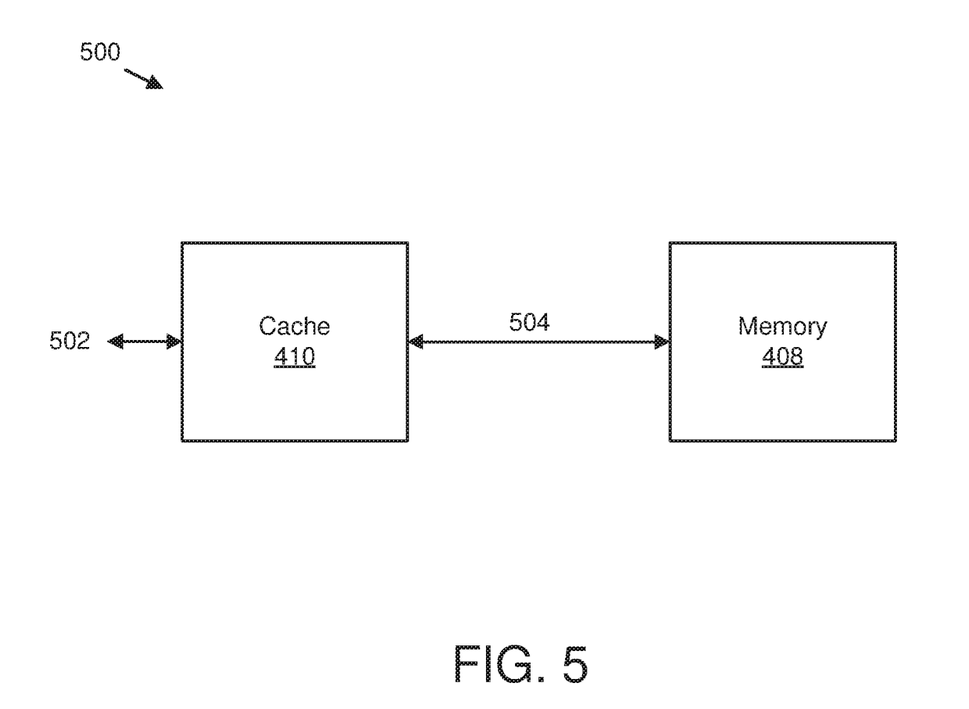
FIG. 5 is a schematic block diagram illustrating one embodiment of a caching system.

FIG. 5 is a schematic block diagram illustrating one embodiment of a caching system 500. The caching system 500 includes the cache 410 and the memory 408. As illustrated, the cache 410 receives a request 502 to access data via the cache 410. The request 502 may be from the memory controller 406 of FIG. 4. In response to receiving the request 502, the cache 410 may attempt to access the data from the cache 410. During read and/or write access, if a cache miss occurs, the cache 410 may communicate 504 with the memory 408 to load data from the memory 408 to the cache 410. As used herein, a cache miss may refer to a failed attempt to read and/or write data in the cache 410. If the cache 410 is full, in order to load data from the memory 408, the cache may need to evict data from the cache 410. During read and/or write access, if a cache hit occurs, the cache 410 may perform the request at the cache 410.

Figure 6:
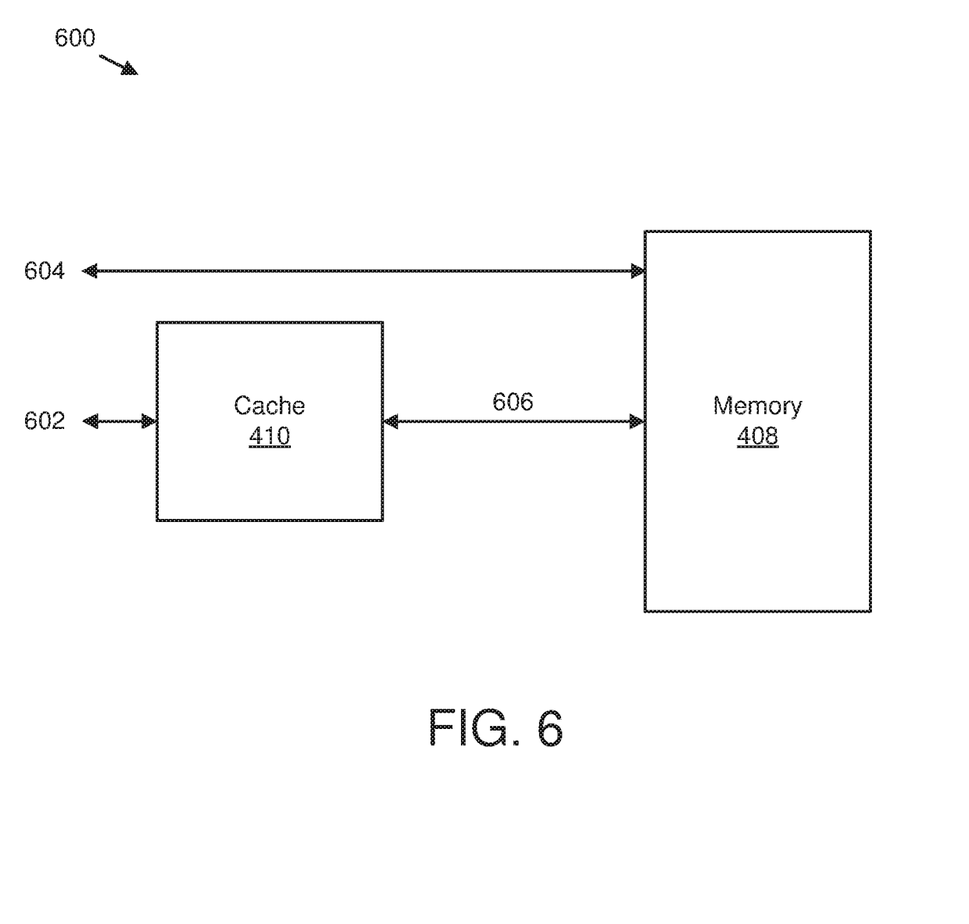
FIG. 6 is a schematic block diagram illustrating another embodiment of a caching system.

FIG. 6 is a schematic block diagram illustrating another embodiment of a caching system 600. The caching system 600 includes the cache 410 and the memory 408. As illustrated, the cache 410 receives a request 602 to directly access data via the cache 410 and/or the memory 408 receives a request 604 to directly access data via the memory 408 (e.g., bypassing the cache 410). The request 602 and/or the request 606 may be from the memory controller 406 of FIG. 4. In response to receiving the request 602, the cache 410 may attempt to access the data from the cache 410. During read and/or write access directly with the cache 410, if a cache miss occurs, unlike the embodiment described in FIG. 5, the cache 410 may not load data from the memory 408 to the cache 410. During read and/or write access directly with the cache 410, only if a cache hit occurs may the cache 410 perform the request at the cache 410. In some embodiments, during a write access directly with the cache 410, the cache 410 may immediately write changes made to the cache 410 to the memory 408. In such embodiments, writes from the cache 410 to the memory 408 may not be included as part of the bandwidth used by the memory 408. During read and/or write access directly with the memory 408, data is directly read and/or written directly with the memory 408.

The balancing component 150 may determine whether accessing data is performed by communicating directly with the memory 408 and/or by communicating directly with the cache 410. In certain embodiments, the balancing component 150 may control access to the memory 408 and the cache 410 based on a bandwidth of the memory 408 and a bandwidth of the cache 410. For example, if the memory 408 has the same bandwidth as the cache 410, then the balancing component 150 may evenly split direct accesses between the memory 408 and the cache 410. As another example, if a ratio of bandwidth between the cache 410 and the memory 408 is 2:1 (e.g., ratio r=2), the cache 410 may have a percentage of total accesses equal to r/(1+r) (e.g., ⅔ or 66.7%) and the memory 408 may have a percentage of total accesses equal to 1/(1+r) (e.g., ⅓ or 33.3%). As a further example, if a ratio of bandwidth between the cache 410 and the memory 408 is 4:1 (e.g., ratio r=4), the cache 410 may have a percentage of total accesses equal to r/(1+r) (e.g., ⅘ or 80%) and the memory 408 may have a percentage of total accesses equal to 1/(1+r) (e.g., ⅕ or 20%).

As may be appreciated, by using the balancing component 150 to split direct communication with the memory 408 and the cache 410, overall bandwidth of a non-volatile memory device may be used more efficiently than by only attempting to increase the hit rate of the cache 410. In certain embodiments, there may be a small working set of data so that entirely fits into the cache 410. In such embodiments, randomizing data access between the memory 408 and the cache 410 may significantly perform better than only performing data access using the cache 410. In some embodiments, the working set of data may be too large to entirely fit into the cache 410. In such embodiments, the balancing component 150 may perform data migration using hardware based cache management to optimize the performance for directly accessing both the memory 408 and the cache 410. The balancing component 150 may balance accesses between the memory 408 and the cache 410 by adaptively controlling data migration to reduce loading of data from the memory 408 to the cache 410 and loading of data from the cache 410 to the memory 408. For example, the balancing component 150 may migrate data to and/or from the cache 410 to facilitate the cache 410 being accessed at a rate that is proportional to the amount of bandwidth available to the cache 410 out of the total bandwidth available to the cache 410 and the memory 408.

Figure 7:
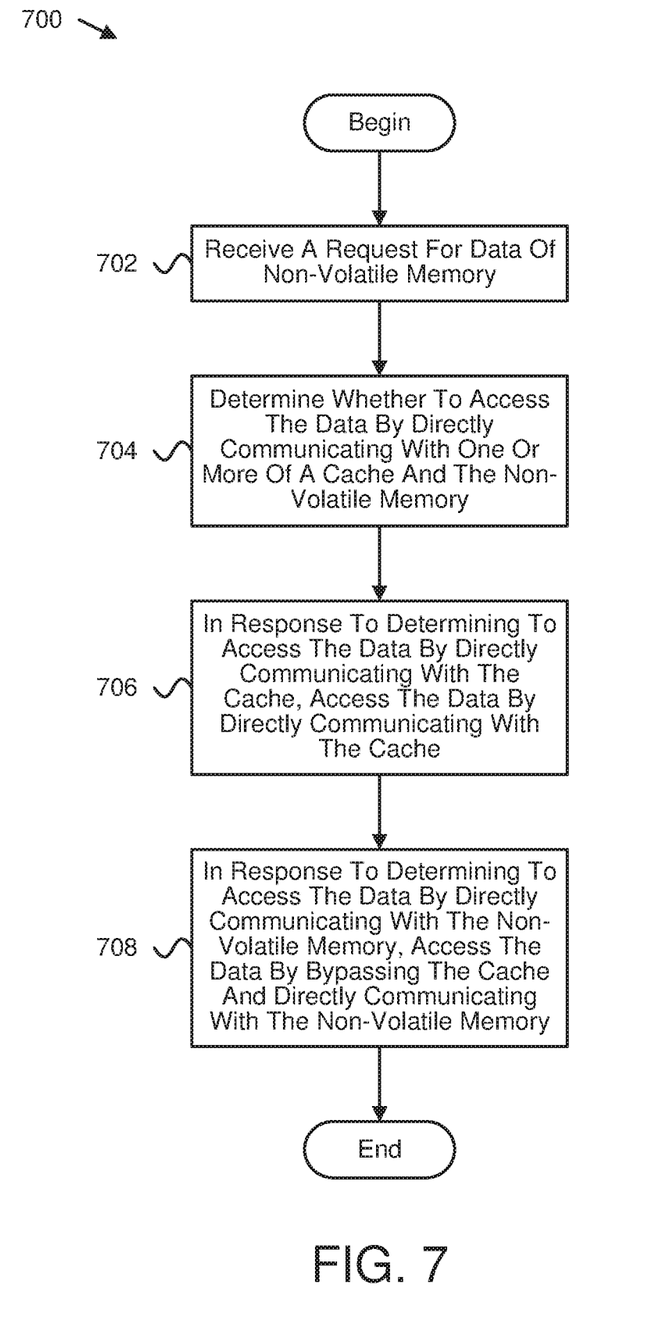
FIG. 7 is a schematic flow chart diagram illustrating one embodiment of a method for balanced caching.

FIG. 7 depicts one embodiment of a method 700 for balanced caching. The method 700 begins, and an input circuit 302 receives 702 a request for data of non-volatile memory. The balancing circuit 304 determines 704 whether to access the data by directly communicating with one or more of a cache and the non-volatile memory. In some embodiments, the balancing circuit 304 may determine 704 whether to access the data by directly communicating with one or more of a cache and the non-volatile memory based on a first rate (or bus width) corresponding to the cache and a second rate (or bus width) corresponding to the non-volatile storage. The data access circuit 306, in response to determining to access the data by directly communicating with the cache, accesses 706 the data by directly communicating with the cache. The data access circuit 306, in response to determining to access the data by directly communicating with the non-volatile memory, accesses 708 the data by bypassing the cache and directly communicating with the non-volatile memory, and the method 700 ends. In certain embodiments, the method 700 includes, in response to determining to access the data by directly communicating with the cache and the non-volatile memory, accessing a first portion of the data by directly communicating with the cache and accessing a second portion of the data by directly communicating with the non-volatile memory.

In some embodiments, determining 704 whether to access the data by directly communicating with one or more of the cache and the non-volatile memory includes determining a cache hit count and a total access count. In various embodiments, the method 700 includes determining to access the data by directly communicating with the cache in response to a relationship between the cache hit count and the total access count being less than a predetermined threshold. In certain embodiments, the method 700 includes determining to access the data by directly communicating with the non-volatile memory in response to a relationship between the cache hit count and the total access count being greater than a predetermined threshold.

In some embodiments, the method 700 includes determining to migrate pages from the non-volatile memory to the cache in response to a relationship between the cache hit count and the total access count being less than a predetermined threshold. In various embodiments, the method 700 includes determining to migrate pages from the cache to the non-volatile memory in response to a relationship between the cache hit count and the total access count being greater than a predetermined threshold. In certain embodiments, determining 704 whether to access the data by directly communicating with one or more of the cache and the non-volatile memory includes determining a first bandwidth corresponding to the cache and a second bandwidth corresponding to the non-volatile memory, and accessing the data based on the first bandwidth and the second bandwidth. In some embodiments, accessing the data based on the first bandwidth and the second bandwidth comprises accessing the data based on a ratio between the first bandwidth and the second bandwidth.

A means for receiving a request to access data of a memory device, in various embodiments, may include a balancing component 150, an input circuit 302, an on-die controller 220, a die state machine 222, other logic hardware, and/or other executable code stored on a computer readable storage medium. Other embodiments may include similar or equivalent means for receiving a request to access data of a memory device.

A means for determining a number of direct communications with a cache to access the data, in various embodiments, may include a balancing component 150, a balancing circuit 304, a counting circuit 306, an on-die controller 220, a die state machine 222, other logic hardware, and/or other executable code stored on a computer readable storage medium. Other embodiments may include similar or equivalent means for determining a number of direct communications with a cache to access the data.

A means for determining a number of direct communications with a memory device, in various embodiments, may include a balancing component 150, a balancing circuit 304, a counting circuit 306, an on-die controller 220, a die state machine 222, other logic hardware, and/or other executable code stored on a computer readable storage medium. Other embodiments may include similar or equivalent means for determining a number of direct communications with a memory device.

A means for determining whether to access the data by directly communicating with one or more of the cache and the memory device based on the number of direct communications with the cache and the number of direct communications with the memory device, in various embodiments, may include a balancing component 150, a balancing circuit 304, a data access circuit 306, a counting circuit 306, an on-die controller 220, a die state machine 222, other logic hardware, and/or other executable code stored on a computer readable storage medium. Other embodiments may include similar or equivalent means for determining whether to access the data by directly communicating with one or more of the cache and the memory device based on the number of direct communications with the cache and the number of direct communications with the memory device.

A means for directly communication with the cache in response to determining to access the data by directly communicating with the cache, in various embodiments, may include a balancing component 150, a balancing circuit 304, a data access circuit 306, a counting circuit 306, an on-die controller 220, a die state machine 222, other logic hardware, and/or other executable code stored on a computer readable storage medium. Other embodiments may include similar or equivalent means for directly communication with the cache in response to determining to access the data by directly communicating with the cache.

A means for bypassing communication with the cache in response to determining to access the data by directly communicating with the memory device, in various embodiments, may include a balancing component 150, a balancing circuit 304, a data access circuit 306, a counting circuit 306, an on-die controller 220, a die state machine 222, other logic hardware, and/or other executable code stored on a computer readable storage medium. Other embodiments may include similar or equivalent means for bypassing communication with the cache in response to determining to access the data by directly communicating with the memory device.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
an input circuit that receives a request for data of non-volatile storage;
a balancing circuit that:
determines whether to execute the request by directly communicating with one or more of a cache and the non-volatile storage based on a first bandwidth corresponding to the cache and a second bandwidth corresponding to the non-volatile storage, wherein the cache and the non-volatile storage are part of the same memory device, a host accesses the memory device via a single bus, a ratio r is formed from the first bandwidth and the second bandwidth, r is a positive value, a first percentage of total accesses for the cache equals [r/(1+r)], a second percentage of total accesses for the memory equals [1/(1+r)], and the cache and the non-volatile storage are directly accessed based on the first percentage and the second percentage; and
moves pages between the cache and the non-volatile storage based on r; and
a data access circuit that executes the request based on the determination made by the balancing circuit.

2. The apparatus of claim 1, further comprising a counting circuit that determines a cache hit count used to determine a cache hit ratio, wherein the balancing circuit uses the cache hit ratio to determine whether to execute the request by directly communicating with one or more of the cache and the non-volatile storage.

3. The apparatus of claim 1, further comprising a counting circuit that determines a cache hit count used to determine a cache hit ratio, wherein the balancing circuit directly communicates with the cache in response to the cache hit ratio being less than a predetermined value.

4. The apparatus of claim 1, further comprising a counting circuit that determines a cache hit count used to determine a cache hit ratio, wherein the balancing circuit directly communicates with the non-volatile storage in response to the cache hit ratio being greater than a predetermined value.

5. The apparatus of claim 1, further comprising a counting circuit that determines a cache hit count used to determine a cache hit ratio, wherein the balancing circuit determines to move pages from the non-volatile storage to the cache in response to the cache hit ratio being less than r.

6. The apparatus of claim 1, further comprising a counting circuit that determines a cache hit count used to determine a cache hit ratio, wherein the balancing circuit determines to move pages from the cache to the non-volatile storage in response to the cache hit ratio being greater than r.

7. The apparatus of claim 1, wherein the data access circuit executes the request by directly communicating with the cache in response to the balancing circuit determining to execute the request by directly communicating with the cache.

8. The apparatus of claim 1, wherein the data access circuit executes the request by bypassing communication with the cache in response to the balancing circuit determining to execute the request by directly communicating with the non-volatile storage.

9. The apparatus of claim 1, wherein the memory device is a direct inline memory module card.

10. A method comprising:
receiving a request for data of non-volatile memory;
determining whether to access the data by directly communicating with one or more of a cache and the non-volatile memory based on a first bandwidth corresponding to the cache and a second bandwidth corresponding to the non-volatile storage, wherein the cache and the non-volatile memory are part of the same memory device, the memory device is a direct inline memory module card, a host accesses the memory device by a single bus, a ratio r is formed from the first bandwidth and the second bandwidth, r is a positive value, a first percentage of total accesses for the cache equals [r/(1+r)], a second percentage of total accesses for the memory equals [1/(1+r)], and the cache and the non-volatile memory are directly accessed based on the first percentage and the second percentage;
migrating pages between the cache and the non-volatile memory based on r;
in response to determining to access the data by directly communicating with the cache, accessing the data by directly communicating with the cache; and
in response to determining to access the data by directly communicating with the non-volatile memory, accessing the data by bypassing the cache and directly communicating with the non-volatile memory.

11. The method of claim 10, further comprising, in response to determining to access the data by directly communicating with the cache and the non-volatile memory, accessing a first portion of the data by directly communicating with the cache and accessing a second portion of the data by directly communicating with the non-volatile memory.

12. The method of claim 10, wherein determining whether to access the data by directly communicating with one or more of the cache and the non-volatile memory comprises determining a cache hit count and a total access count.

13. The method of claim 12, further comprising determining to access the data by directly communicating with the cache in response to a relationship between the cache hit count and the total access count being less than a predetermined threshold.

14. The method of claim 12, further comprising determining to access the data by directly communicating with the non-volatile memory in response to a relationship between the cache hit count and the total access count being greater than a predetermined threshold.

15. The method of claim 12, further comprising determining to migrate pages from the non-volatile memory to the cache in response to a relationship between the cache hit count and the total access count being less than r.

16. The method of claim 12, further comprising determining to migrate pages from the cache to the non-volatile memory in response to a relationship between the cache hit count and the total access count being greater than r.

17. A system comprising:
a cache;
a non-volatile memory, wherein the cache and the non-volatile memory are part of the same memory device and a host accesses the memory device via a single bus; and
a controller configured to:
determine a first bandwidth corresponding to the cache;
determine a second bandwidth corresponding to the non-volatile memory;
determine a ratio r formed from the first bandwidth and the second bandwidth, wherein r is a positive value;
determining a first percentage of total accesses for the cache equal to [r/(1+r)], and a second percentage of total accesses for the memory equal to [1/(1+r)];
move pages between the cache and the non-volatile memory based on r;

determine whether to directly communicate with one or more of the cache and the non-volatile memory based on the first percentage and the second percentage;

in response to determining to directly communicate with the cache, directly communicate with the cache; and in response to determining to directly communicate with the non-volatile memory, bypass the cache and directly communicate with the non-volatile memory.

18. An apparatus comprising:

means for receiving a request to access data of a memory device;

means for determining a first bandwidth corresponding to a cache;

means for determining a second bandwidth corresponding to a memory device;

means for determining whether to access the data by directly communicating with one or more of the cache and the memory device based on the first bandwidth and the second bandwidth, wherein the cache and the memory device are part of the same non-volatile direct inline memory module, a host accesses the non-volatile direct inline memory module via a single bus, a ratio r is formed from the first bandwidth and the second bandwidth, r is a positive value, a first percentage of total accesses for the cache equals [r/(1+r)], a second percentage of total accesses for the memory equals [1/(1+r)], and the cache and the memory device are directly accessed based on the first percentage and the second percentage; and means for moving pages between the cache and the memory device based on r.

19. The apparatus of claim 18, further comprising means for directly communication with the cache in response to determining to access the data by directly communicating with the cache.

20. The apparatus of claim 18, further comprising means for bypassing communication with the cache in response to determining to access the data by directly communicating with the memory device.

* * * * *